United States Patent [19]

Jurisch et al.

[11] Patent Number: 5,698,840

[45] Date of Patent: Dec. 16, 1997

[54] RECEPTACLE FOR INSTALLATION OF DATA OR CODE CARRIERS

[75] Inventors: Reinhard Jurisch; Peter Peitsch, both of Erfurt, Germany

[73] Assignee: Micro-Sensys GmbH, Erfurt, Germany

[21] Appl. No.: 504,627

[22] Filed: Jul. 20, 1995

[30] Foreign Application Priority Data

Jul. 21, 1994 [DE] Germany ............... 44 25 736.8

[51] Int. Cl.$^6$ .................................................. G06K 19/06
[52] U.S. Cl. ........................ 235/493; 235/492; 235/449
[58] Field of Search .................................. 235/381, 382, 235/382.5, 383, 385, 488, 492, 493, 449

[56] References Cited

U.S. PATENT DOCUMENTS

| | | | |
|---|---|---|---|
| 4,983,820 | 1/1991 | Dias | 235/492 |
| 4,992,648 | 2/1991 | Hutchison | 235/379 |
| 5,057,679 | 10/1991 | Audie | 235/492 |
| 5,208,450 | 5/1993 | Uenishi et al. | 235/492 |
| 5,321,240 | 6/1994 | Takahira | 235/492 X |
| 5,322,992 | 6/1994 | Castleman | 235/492 |
| 5,399,847 | 3/1995 | Droz | 235/492 X |
| 5,428,214 | 6/1995 | Hakkers et al. | 235/492 |
| 5,585,618 | 12/1996 | Droz | 235/492 |

FOREIGN PATENT DOCUMENTS 40 34 225A1  4/1992  Germany .

OTHER PUBLICATIONS

Dallas Semiconductor Memory Chip Article, pp. 1–72, Feb. 2, 1994.
Pepperl & Fuchs, "Induktives Identifikations—System Technik", pp. 10–14, Mannheim, Germany, Sep. 1989.

*Primary Examiner*—Donald T. Hajec
*Assistant Examiner*—Karl Frech
*Attorney, Agent, or Firm*—Jordan and Hamburg

[57] ABSTRACT

A receptacle for mounting data carriers or code carriers which are inductively and/or electromagnetically read and/or written and which are to be embedded flush in a metallic environment requires a minimum of discrete members and simultaneously ensures an effective energy transfer from a sender coil to the data carrier or code carrier. A prefabricated receptacle adapted to a geometry of a mounting recess in the metallic object, the receptacle is made of an injection molding and/or casting material to which materials are added to set the relative magnetic permeability $\mu_r$ of the receptacle to at least 2 or greater and its specific ohmic resistance sufficiently high (>Ω·m), the receptacle entirely encases the data carrier or the code carrier and further components, if any.

11 Claims, 1 Drawing Sheet

5,698,840

RECEPTACLE FOR INSTALLATION OF DATA OR CODE CARRIERS

BACKGROUND OF THE INVENTION

The invention relates to a receptacle for mounting data carriers or code carriers which are inductively and/or electromagnetically read and/or written and are to be embedded in a metallic environment.

Data carriers and/or code carriers of the kind are disclosed, for example, in the Patent Specification DE 40 34 225.A1. Such systems, hereinafter exclusively designated as data carriers, find an increasing application in the identification of tools, or objects or products of industrial production. The respective data carriers are attached, for example, by adhesives to a surface of the objects to be identified. Depending on the technological procedure, this mounting is disadvantageous because the data carriers are subject to removal due to mechanical stresses during manufacturing or by later applications and, hence, can get lost. Therefore it has been proposed to embed the data carriers into the surface area of an object to be identified flush with the surface. Very often such objects to be identified are made of metal. Since the data carriers are inductively read and/or written via an external sender and detector coil a comparatively large portion of the magnetic field lines passes through the metal encompassing the data carrier which causes considerable attenuation of the magnetic field when the object, as it were, forms a metallic circle around the data carrier. This leads to a considerable reduction of the energy transfer from the sender coil to the data carrier and, thus, to a deterioration of the data transfer. To obviate this problem it has been proposed to install the data carrier in the metallic surface by interposing an intermediate non-metallic auxiliary mount satisfying definite distances to the lateral metallic rim portions of the surface encompassing the data carrier. In a most advanced solution (refer to, for example, information material of the firm Pepperl & Fuchs, "Induktives Identifikationssystem ", pp. 10 to 14, Mannheim, Germany) the coil winding of the data carriers enclosed in opposition to the object by a shell core made of sintered ferrite. Conventionally, such shell cores are employed to set up coils having considerably small stray fields and are employed for printed circuit assembly or for the aliment in inductive space detectors. Such data carriers with their shell cores and, if required, with further components are embedded in an additional sealing cup, with hollow spaces filled by epoxy, and then are inserted into a recess of the metallic surface area. This solution is disadvantageous due to the comparatively low breaking strength of the sintered shell cores used, since, as a rule, these are made of ferrite ceramics; it is further disadvantageous due to the expenditures for the procedure and costs resulting from the kind of manufacture, and furthermore to the comparatively large space required for insertion in the metallic surface.

SUMMARY OF THE INVENTION

It is an object of the present invention to provide a non-expensive flush mounted embedding of data or code carriers in metallic objects which requires a minimum of components and ensures an effective energy transfer from the sender coil to the data or code career.

BRIEF DESCRIPTIONS OF THE INVENTION

According to the present invention this a receptacle encases all components and, in particular, a data carrier or code carrier without the use of any additional means in a module permitting a simple flush with surface embedding in metallic objects, without any adjustments and in a minimum of space.

BRIEF DESCRIPTION OF THE DRAWINGS

The invention will be explained hereinafter in more detail by the accompanying drawings which illustrate diagrammatically and by way of example two embodiments thereof and in which.

DETAILED DESCRIPTION OF THE INVENTION

Figure 1:
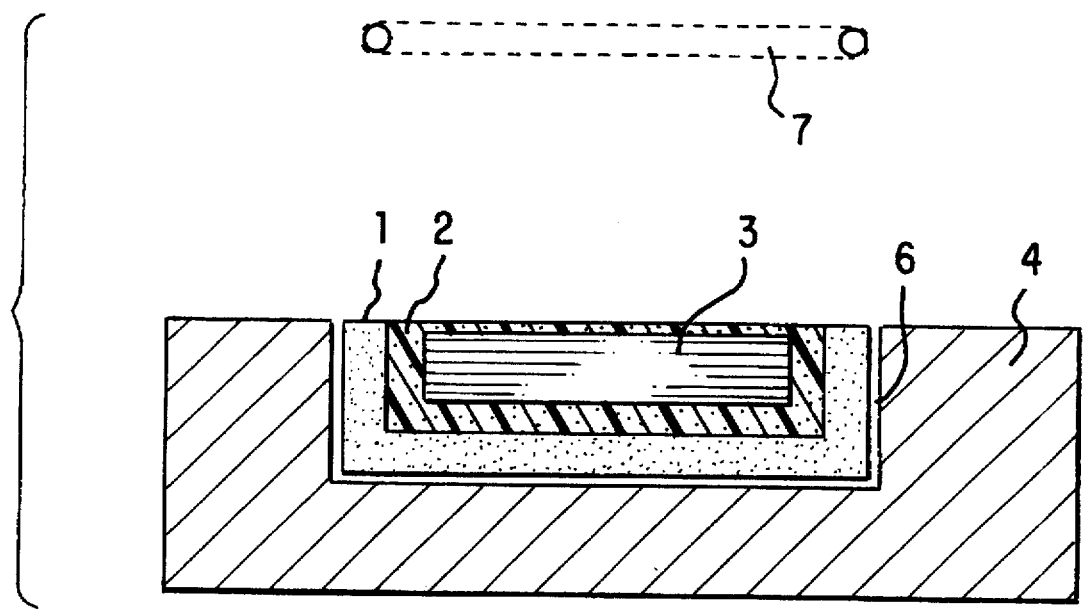
FIG. 1 is a schematical view of an embodiment of the inventional receptacle, and FIG. 2 an improvement of the embodiment according to FIG. 1.

FIG. 1 shows a section of a randomly selected metallic object 4 such as a tool holder, a measuring means, a car chassis or the like. In the metallic object a recess provides a mounting opening 6 for receiving a mounting receptacle 1 according to the invention. The mounting receptacle 1 is made of a material which permits injection molding and/or casting and to which permeable materials are added in such a manner that the relative magnetic permeability $\mu_r$ of the receptacle 1 is at least 2 or greater, preferably lies between 10 and 30, and the specific ohmic resistance is sufficiently high (>1 $\Omega\cdot$m). A practicable outer geometry of the receptacle 1 depends on the installation conditions, and on special requests of a customer, can be adapted without any problems. Typically, a cylindrical outer geometry for the receptacle 1 is to be preferred which easily fits into a bore hole. Before mounting, the receptacle 1 is provided at least with the data and/or code career 3 and the corresponding sender and detector coils (not shown in detail) and sealed with a preferably hardening sealing compound 2 such as an epoxy. It is easily feasible to mount such a prefabricated receptacle 1 and to arrest it, for example, by use of an adhesive, in such a manner that it is flush with the surface of a metallic object. Furthermore, in FIG. 1 a sender coil 7 is schematically indicated in spaced relation above the data or code carrier 3.

Figure 2:
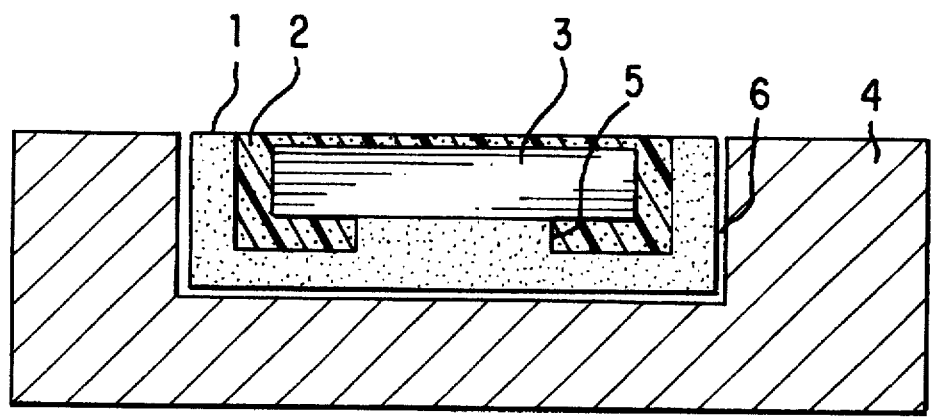

In FIG. 2 a further advantageous modification of FIG. 1 is schematically represented which, otherwise identical to FIG. 1, is provided with a base 5. It is feasible to constitute the base 5 by a discrete component. However, it is preferably made of the same material and in one piece with the receptacle 1 manufactured by a complex injection molding or casting process. The respective height of the base 5 is adapted to the data or code carrier 3 and to the special sender and detector conditions and, hence, can be definitely preselected at will. The data carrier or code carrier 3 is supported by the base 5 and adjusted by the latter before filling the receptacle 1 with the sealing compound 2. Simultaneously and due to the incorporated permeable materials, the base 5 provides an extended path for directing the magnetic field lines emitted by the sender coil 7, thus enhancing the voltage transfer according to the object oft he present invention.

Since the inventional solution is operative without any additional shell cores the construction can be size-reduced which is advantageous with respect to the required mounting openings in the metallic objects apart from a considerable reduction of expenditures for manufacture.

We claim:

1. A receptacle housing for mounting a data carrier which is one of inductively and electromagnetically communicated with and is to be embedded in a mounting opening in a metallic object, the receptacle housing comprising:

a receptacle member conforming to a geometry of said mounting opening;

said receptacle member being formed of art injection molded and/or casted material including magnetically permeable materials adjusting a relative magnetic permeability $\mu_r$ of said receptacle member to at least 2 or greater and a specific ohmic resistance of said receptacle member to greater than 1 $\Omega \cdot m$; and said receptacle member having a recess for accepting said data carrier such that a surface of said data carrier for accepting one of inductive and electromagnetic signals faces out of said recess where said receptacle member is to be installed in said mounting opening with said recess facing out of said mounting opening.

2. The receptacle housing as claimed in claim 1, wherein said magnetically permeable materials have a relative magnetic permeability of from 10 to 30.

3. The receptacle housing as claimed in claim 1, wherein said data carrier is encased in said receptacle member and protected against an outside environment by means of a sealing component.

4. The receptacle housing as claimed in claim 1, wherein said receptacle member has a base boss on a bottom surface of said recess for supposing the data carrier.

5. The receptacle housing as claimed in claim 4, wherein the base boss and said receptacle member are formed as a whole.

6. The receptacle housing as claimed in claim 1, wherein:

said recess has a depth substantially equal to or greater than a depth of said data carrier; and said receptacle member has a maximum depth substantially equal to or less than a depth of said mounting opening permitting mounting of said receptacle member in said mounting opening such that a top surface of said receptacle member is flush with a surface of said metallic object surrounding said mounting opening.

7. A data communicating device for embedding in a mounting recess in a metallic object, the data communicating device comprising:

a data carrier which is one of inductively and electromagnetically communicated with;

a receptacle member conforming to a geometry of said mounting recess;

said receptacle member being former of an injection molded and/or casted material including magnetically permeable materials adjusting a relative magnetic permeability $\mu_r$ of said receptacle member to at least 2 or greater an a specific ohmic resistance of said receptacle member to greater than 1 $\Omega \cdot m$;

said receptacle member having a recess for accepting said data carrier such that a surface of said data carrier for accepting one of inductive and electromagnetic signals faces out of said recess where said receptacle member is to be installed in said mounting recess with said recess facing out of said mounting recess;

said data carrier being held in said receptacle member and protected against an outside environment by means of a sealing component;

said recess having a depth substantially equal to or greater than a depth of said data carrier; and said receptacle member having a maximum depth substantially equal to a depth of said mounting recess permitting mounting of said receptacle member in said mounting recess such that a top surface of said receptacle member is flush with a surface of said metallic object surrounding said mounting recess.

8. The receptacle housing as claimed in claim 7, wherein said magnetically permeable materials have a relative magnetic permeability of from 10 to 30.

9. The receptacle housing as claimed in claim 7, wherein said receptacle member has a base boss on a bottom surface of said recess for supporting the data carrier.

10. The receptacle housing as claimed in claim 9, wherein the base boss and said receptacle member are formed as a whole.

11. A method of flush mounting a data carrier which is one of inductively and electromagnetically communicated with in a metallic object comprising:

forming a mounting recess in said metallic object;

forming a receptacle member in a configuration conforming to a geometry of said mounting recess and having a depth substantially equal to or less than a depth of said mounting recess;

said forming of said receptacle member including:

introducing magnetically permeable materials into an encapsulating material to adjust a relative magnetic permeability $\mu_r$ of said encapsulating material to at least 2 or greater and a specific ohmic resistance of said encapsulating material to greater than 1 $\Omega \cdot m$; and one of injection molding and casting said encapsulating material into said configuration;

forming a recess in said receptacle member for accepting said data carrier such that a receiving surface of said data carrier for accepting one of inductive and electromagnetic signals faces out of said recess where said receptacle member is to be installed in said mounting recess with said recess facing out of said mounting recess and a depth of said recess is substantially equal to or less than a depth of said data carrier;

fixing said data carrier in said recess and protecting said data carrier against an outside environment by means of a sealing component, said data carrier being fixed in said recess with said receiving surface being one of at and below a surface of said receptacle member surrounding said recess; and mounting said receptacle member in said mounting recess such that a top surface of said receptacle member is flush with a surface of said metallic object surrounding said mounting recess.

\* \* \* \* \*